July 4, 1944.  C. D. TRIPP  2,352,668
LOCK NUT AND METHOD OF MAKING SAME
Filed March 1, 1943
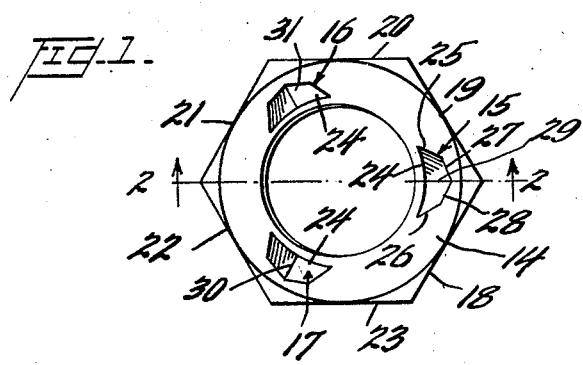
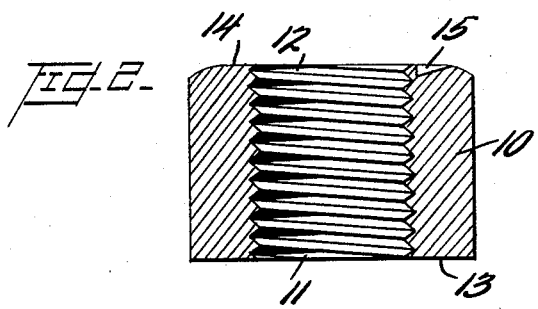
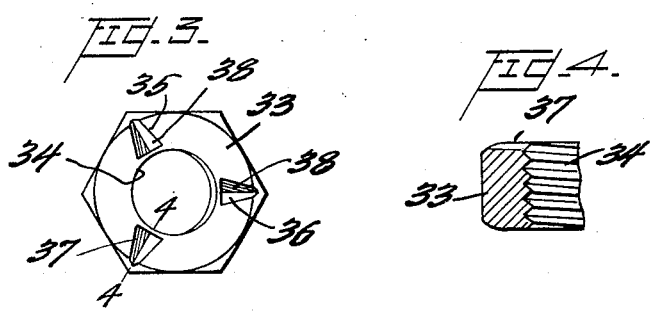
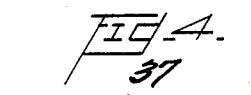
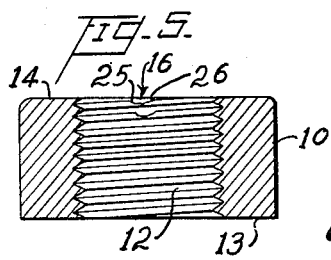
Inventor
Chester D. Tripp,
By Strauch & Hoffman
Attorneys Patented July 4, 1944

2,352,668

UNITED STATES PATENT OFFICE 2,352,668

LOCK NUT AND METHOD OF MAKING SAME

Chester D. Tripp, Chicago, Ill.

Application March 1, 1943, Serial No. 477,600

17 Claims. (Cl. 151—21)

This invention relates to an improved lock nut and a method of producing the same. More particularly, the invention is concerned with an improvement in structure and method as applied to lock nuts of the type in which the lock is provided by indentation of the end face of the nut so as to produce an alteration in the form of the thread of the nut or in its depth or width.

A number of ways of indenting nuts, and the end face thereof, to provide a lock by alteration of the form, depth, width or other characteristic of the thread have been heretofore proposed. Some of these have been successful in practice and have gone into quite extensive commercial use where the provision of a lock, regardless of the uniformity of the hold of the various nuts on the bolts, was all that was required in use. Experience has shown that such nuts of like character and size vary widely in their hold on the bolt.

In many instances it is necessary or desirable that the hold of a particular nut, on the bolt or the like to which it is applied, shall in each instance assume a definite value, which may be predetermined in advance in accordance with the severity of the service to which the mechanism, machine or device, to which the nut is applied, may be subjected. Methods heretofore proposed to produce lock nuts, meeting the special conditions just stated, are relatively complex and difficult of application in practice and the nut structures depart substantially from the simplicity that characterizes lock nuts produced by such a simple operation as indenting the end face of the nut to produce the lock. As a consequence, nuts now on the market, that have a definite grip in each instance on the bolt or the like, are relatively costly to make.

The primary object of the present invention is to provide an improved nut that is indented in its outer face in such manner that the grip or hold exerted by the nut on the bolt or the like will be substantially uniform in degree in nuts of like character and size.

Another principal object of the invention is to provide a method of indenting threaded nuts to produce a lock which will have substantially the same effect on nuts that are of substantially the same character and size to the end that uniform results may be obtained from the use of like nuts.

Still another object of the invention is to provide a method of indenting nuts to cause like nuts to grip like bolts to substantially the same degree characterized by the fact that the grip may be varied in approximate proportion to the degree of pressure exerted in forming the indentations whereby a convenient way is provided for controlling the degree of hold of the nut by control of the pressure in indenting them.

Another object of the invention is to provide a nut in which the indentation of the end face thereof is limited to a plurality, preferably three, of circumferentially equally spaced indentations of spot-like character producing an alteration of the thread of the nut limited to spaced points around the nut opening between which the normal thread is maintained substantially unimpaired.

Still another object of the invention is to provide a lock nut having a plurality of symmetrically arranged spot-like indentations shaped and located with respect to the thread of the nut so that the depth of the indentations will substantially proportionally vary the effect on the nut thread and thus the force needed to advance the nut with its distorted thread along the shank of the bolt or the like.

A further object of the invention is to provide an indented lock nut that will grip the bolt or the like to a degree that may be readily predetermined, and at the same time provide a hold that will not destroy or seriously impair the thread of the bolt in application or removal of the nut, and which will yet be effective in still gripping the bolt after one or several removals and applications of the same nut to the bolt or the like.

Further objects of the invention will appear as this description of the invention proceeds with reference to the accompanying drawing in which, Figure 1 is a plan view of a preferred form of nut including the present invention;

Figure 2 is a transverse section of the nut taken on the plane 2—2 of Figure 1;

Figure 3 is a plan view of a modified form of nut;

Figure 4 is a transverse section taken on the plane designated 4—4 on Figure 3; and Figure 5 is a sectional view similar to Figure 2 but looking directly into a deformed section of the thread and illustrating the manner in which the thread is deformed.

Like reference characters indicate like parts in the several views.

In the form of the invention illustrated in Figures 1 to 4, inclusive, 10 designates the body of a nut having an opening 11 the wall of which is threaded in conventional manner to provide a thread 12 extending from the bottom end face 13 to the top end face 14 of the nut. A relatively fine S. A. E. thread is illustrated in the drawing. The thread may, of course, assume any form.

In order to convert the conventional nut just described into a lock nut, spaced spot-like depressions 15, 16 and 17 are pressed into the body of the nut from end face 14. Each depression is circumferentially spaced substantially from adjacent depressions, as illustrated, leaving a substantial zone in said face between adjacent depressions that remains unaltered, whereby the thread portions beneath said zones remain unaffected in the formation of said depressions.

Preferably three depressions are formed as illustrated, and said depressions are arranged radially inward of the angles formed by the side faces of the nut, depression 15 being located inwardly of the angle between side faces 18 and 19, 16 inwardly of the angle between faces 20 and 21 and 17 inwardly of the angle between faces 22 and 23. While three depressions are preferred, a smaller or larger number may be used depending on the size and shape of the nut. While hexagonal nuts are illustrated in the drawing, this invention is applicable to square or other forms.

In outline, the depressions preferably each have a base of major length adjacent the nut opening and an outline generally tapering or diminishing in length outwardly of said opening toward a point on the radial line from the adjacent side face angle as illustrated. For example, in the drawing, the base 24 of each depression approximately parallels the wall of the nut opening and is spaced inwardly of the apex of thread 12 a distance slightly greater than the depth of said thread whereby destruction or complete mutilation of the end convolution of the thread is avoided in forming the depressions. Said base is preferably spaced about one thirty-second of an inch outwardly of the root of the underlying thread in nuts of one-half to three-quarters of an inch in size. The spacing is proportionally less is smaller nuts and larger in larger nuts. The sides 25 and 26 of each depression taper outwardly of said opening and toward each other and each depression terminates outwardly in two diverging portions 27 and 28 meeting at a point on a radial line from the adjacent nut corner. While the outline just specifically described is preferred, spaced spot-like depressions in other outlines may be employed. For example round depressions produced by ball shaped lugs on the die presently to be referred to.

Each of the depressions 15, 16 and 17 preferably has a depth that increases gradually from a minimum at sides 25 and 26 toward a maximum on lines 29, 30 and 31. The depressions also increase in depth from the portions 27 and 28 toward a maximum at the base 24 with the result that the point of maximum depth of each depression is on its base line 24.

The depressions 15, 16 and 17 are formed by forcing the nut against a die having protruding lugs tapering toward ends shaped to produce them, or by pressing said die against an unyieldingly supported nut. The former arrangement is preferred.

It will be readily understood that by utilizing die lugs that taper toward their ends, the areas of the depressions formed in the nut will vary in proportion to the depth of the depression. That is, when the desired lock is of small value and the exerted pressure is small the smaller tapered portions of the lugs enter the nut only a small distance and form smaller triangles than when, due to the exertion of greater pressure, the tapered lugs enter the nut greater distances producing depressions of somewhat larger areas.

The use of tapering lugs compensates to a large extent for variations in the plasticity of the steel from which the nut is made. For variations in area of the depressions have very little effect on the amount of lock. This is mainly determined by the depth thereof. Nevertheless tapered lugs are preferred because a control of the depth for a predetermined pressure is thus provided. For if a depression of a depth say .0020 inch were needed for a predetermined lock, said depth would vary materially when made by untapered lugs subject to a definite pressure depending on the hardness of the steel of which the nut is made. By using tapered lugs which provide increased resistance as the lugs enter the nut, variations in the steel are largely compensated for, because the resistance of the steel to a wedging action tending to displace it laterally of the direction of the applied force is nearly uniform in steels differing somewhat in hardness. It will thus be seen that the taper of the lugs provides a control that results in automatic compensation for some of the variations that may appear in the steel of which the nuts are made.

It has been found that the effect of the depressions, just described, in providing a lock when the nut is applied to a bolt is substantially the same on like nuts applied to identical bolts, if the pressure to force the lugs of the die into the nut body is maintained at the same degree. It has been found further that when said pressure is increased or diminished the depth of the depressions is increased or reduced and a proportionally greater or less locking effect on the nut thread is obtained. Accordingly the locking effect of a nut on its bolt may be controlled by providing spaced spot-like depressions of the kind described in the end face of the nut by the application of a predetermined pressure selected in accordance with the degree of hold it is desired the nut shall have on the bolt when forcibly turned into engagement therewith.

A preferred way of controlling the pressure, exerted in forming the depressions contemplated as a part of the present invention, consists in connecting the die, that carries the protruding lugs, to the front of a plunger subjected at its rear to fluid or hydraulic pressure the value of which can easily be measured by a conventional pressure gauge of any known type. The plunger is disposed in a cylinder to move therein as a piston, a pressure accumulator or like source of pressure being in communication with the cylinder so that any desired predetermined pressure can be secured to back up the movement of the die, the gauge providing a ready way of determining when the desired pressure has been accumulated in the cylinder. The nuts are properly positioned and forced against said die by supporting them on a platen that is reciprocated toward the protruding lugs of the die. The length of the stroke of the platen is slightly more than enough to force the lugs of the die into the outer nut face to the desired depth. The force exerted will be predetermined by the total pressure backing up the die. The die yields when the platen exerts a force on the nut exceeding that which backs the die. Thus a simple way of predetermining the depth of the depressions in the nut face and thereby the hold of the nut on the bolt is provided. A suitable device of this general character is described and claimed in my copending application Serial No. 517,409, filed January 7, 1944.

It has been found to be desirable in some instances to shape the lugs of the die to clip or cut the metal of the nut along the base 24 of each depression and about half-way outwardly of the nut opening along the sides 25 and 26 of each depression. The other edges of the protruding lugs are relatively blunt causing no cutting of the metal along the shallower portions of the depressions along the remainder of sides 25 and 26 or along the portions 27 and 28 thereof.

The effect of the formation of the depressions varies somewhat depending on the depth, which as already pointed out will vary in accordance with the amount of applied pressure. Generally, however, the deflection causes a change in the angle of the thread and brings the entire thread down at the depressions somewhat though this is not as pronounced at the root of the thread due to the taper of the die lugs. The deflection may carry down one and one-half or two threads depending on the size of the nut and whether it is a coarse or fine thread. The deflection, if any, is less on the second thread convolution than on the top convolution.

In order to practice the present invention it has been found that

⅜″ nuts—16 threads to 1″ requires approximately 1500 lbs. pressure on the die.

½″ nuts—13 threads to 1″ requires approximately 3225 lbs. pressure on the die.

⅝″ nuts—11 threads to 1″ requires approximately 5000 lbs. pressure on the die.

¾″ nuts—10 threads to 1″ requires approximately 7500 lbs. pressure on the die.

⅞″ nuts—9 threads to 1″ requires approximately 10,000 lbs. pressure on the die.

1″ nuts—8 threads to 1″ requires approximately 12,500 lbs. pressure on the die.

⅜″ nuts—24 threads to 1″ requires approximately 1250 lbs. pressure on the die.

½″ nuts—20 threads to 1″ requires approximately 4700 lbs. pressure on the die.

⅝″ nuts—18 threads to 1″ requires approximately 7800 lbs. pressure on the die.

It is necessary, however, to check the hold or lock provided by torque test in Riehle or like testing machine, and sometimes to diminish or increase the pressure because such uncertain factors as large variations in the analysis of steel in bolts and nuts, and imperfections appearing in the completed nuts or bolts, enter into the hold or lock provided.

Like nuts made under like pressures as already described will provide a substantially uniform hold on the bolts for which they are provided and will require the application of substantially the same force to a wrench to move the nut along the bolt against the hold on the bolt provided by the alteration of the nut thread accomplished by the formation of the depressions. It has been found that a lock nut, made as described, can be removed from the bolt and reapplied and upon reapplication will still have a hold on the bolt substantially the same as upon the first application. Of course, if the nut is removed and reapplied to the bolt many times the locking effect then diminishes with each application and removal.

Figures 3 and 4 illustrate a nut 33 made of soft material and having a relatively coarse U. S. S. thread 34 and having spaced spot-like indentations in its end face to provide a lock on the bolt to which it is to be applied. The outline of the indentations is preferably triangular, a shape preferred for smaller nuts, and the arrangement with respect to the nut corners, and the opening in the nut is the same as in the form of the invention already described. The indentations preferably increase in depth from the sides of the triangles toward the altitudes 38 and along the altitudes from the apex to the base of the triangle so that each depression has its maximum depth at the point of intersection of altitude and base.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A lock nut having widely circumferentially spaced indentations in the end face of the nut, said indentations having a maximum depth at points located close to the threaded nut opening and gradually diminishing depth outwardly and circumferentially of said opening, said indentations affecting said thread mainly in narrow portions adjacent said points and to a progressively lesser degree at opposite sides of said points of said thread, the thread being undistorted except adjacent said indentations.

2. The lock nut of claim 1 in which said indentations are three in number.

3. The lock nut of claim 1 in which said indentations are generally triangular in outline.

4. The lock nut of claim 1 in which said indentations are generally triangular in outline and are arranged so that the bases of the triangles are adjacent said opening.

5. A lock nut having spaced relatively shallow spot-like indentations in the end face, said indentations tapering in several directions toward points of maximum depth located radially outwardly of the threaded nut opening a distance substantially equal to the depth of the nut thread.

6. A lock nut having a plurality of widely circumferentially spaced indentations in the end face thereof, said indentations each tapering in a plurality of directions toward points of maximum depth located outwardly of but close to the bottom of the thread groove, the wall of each indentation adjacent the nut opening generally paralleling the wall of said opening and tapering only slightly radially outwardly toward its point of maximum depth.

7. A lock nut having the metal at the bottom of the thread of the nut pressed downwardly toward the underlying thread to a depth that increases progressively in a plurality of directions to points of maximum depth at three circumferentially widely spaced spots, said spots being located close to the bottom of the thread groove of the nut.

8. The method of providing a nut with a grip of substantially controllable degree on the thread of a bolt which comprises indenting the outer face of the nut at widely-spaced circumferential points under measured pressure determining the depth of indentation.

9. The method of providing a nut with a lock of substantially controllable degree on the thread of a bolt, which comprises forming indentations under measured pressure in the outer face of the nut at circumferentially spaced points so that each of the indentations has a maximum depth at points above, or slightly radially outward and above, the bottom of the thread of the nut.

10. The method of providing a nut with a lock of substantially controllable degree, which comprises forming a plurality of spot-like tapered depressions in the end face of the nut by forcing the nut against a die having a plurality of projections tapering toward points and backed by a yielding measured pressure.

11. The method of providing a nut with a lock, which comprises forcing a yielding die having three projections each tapering to a point in a plurality of directions against the end face thereof to depress the metal of the nut at three substantially spaced spots and continuing the application of pressure by said die until the application of a predetermined pressure causes said die to yield.

12. A lock nut having three spot-like tapering depressions in the end face thereof, each of said depressions having walls tapering in several directions toward a point of maximum depth above and slightly radially outwardly of the bottom of the thread of the nut.

13. A lock nut having three spot-like tapering depressions, said depressions being each substantially triangular in outline and having walls tapering in several directions toward a point of maximum depth above and slightly radially outwardly of the bottom of the thread of the nut.

14. A hexagonal nut having spot-like depressions between three of the corners of the nut and the opening therein, said depressions each varying in depth from the edges thereof toward a point of maximum depth above and slightly radially outwardly of the bottom of the thread of the nut.

15. The method of providing a nut with a lock, which comprises forcing a die having a plurality of projections that taper to points at their ends with a measured pressure against the end face thereof to depress the metal of the nut at a plurality of points to a degree determined substantially by said pressure.

16. A lock nut having a plurality of spot-like depressions in an end face thereof, the maximum depth of said depressions being at points spaced slightly outwardly of the root of the thread of the nut and the depth thereof being progressively less from said points in directions toward the periphery of the nut and circumferentially of the nut opening.

17. In a lock nut having a plurality of circumferentially spaced shallow depressions in an end face thereof having a maximum depth adjacent the root of the nut thread, the method of making said nut, which comprises the steps of initially exerting pressures directed substantially axially of the nut upon regions of small area adjacent the root of the nut thread, and progressively applying pressures of increasing magnitude and simultaneously increasing the end face areas of the depressions in the nut to which said pressures are applied, in all directions from said regions of small area except in a direction toward the root of the nut thread, and continuing the application of pressures of increasing magnitude until a pressure of predetermined magnitude and said maximum depth of depression is attained.

CHESTER D. TRIPP.